(12) United States Patent
Li (10) Patent No.: US 10,999,085 B2
(45) Date of Patent: May 4, 2021

(54) POWER CONTROL METHOD, DEVICE AND ELECTRONIC EQUIPMENT IN ETHERNET POWER SUPPLY SYSTEM

(71) Applicant: HANGZHOU HIKVISION DIGITAL TECHNOLOGY CO., LTD., Hangzhou (CN)

(72) Inventor: Duanyu Li, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/349,928

(22) PCT Filed: Sep. 4, 2017

(86) PCT No.: PCT/CN2017/100340
§ 371 (c)(1),
(2) Date: May 14, 2019

(87) PCT Pub. No.: WO2018/090695
PCT Pub. Date: May 24, 2018

(65) Prior Publication Data
US 2019/0334731 A1 Oct. 31, 2019

(30) Foreign Application Priority Data
Nov. 16, 2016 (CN) .......................... 201611006525.1

(51) Int. Cl.
*H04L 12/10* (2006.01)
*G06F 1/26* (2006.01)
*H04L 12/40* (2006.01)

(52) U.S. Cl.
CPC .............. *H04L 12/10* (2013.01); *G06F 1/266* (2013.01); *H04L 12/40045* (2013.01)

(58) Field of Classification Search
CPC .... H04L 12/10; H04L 12/40045; G06F 1/266
See application file for complete search history.

(56) References Cited

U.S. PATENT DOCUMENTS

| 8,934,937 B1 | 1/2015 | Zehr et al. |
| 2005/0243861 A1 | 11/2005 | Elkayam et al. |

(Continued)

FOREIGN PATENT DOCUMENTS

| CN | 101820348 | 9/2010 |
| CN | 101964509 | 2/2011 |

(Continued)

OTHER PUBLICATIONS

Extended European Search Report issued in corresponding European Patent Application No. 17871304.6, dated Aug. 14, 2019.

(Continued)

*Primary Examiner* — Daniel Kessie
(74) *Attorney, Agent, or Firm* — Norton Rose Fulbright US LLP (57) ABSTRACT

Disclosed is a power control method applicable to a power over Ethernet system, which includes: when it is determined that there is a target powered device connected to the power over Ethernet system, calculating a sum of actual power of all powered devices currently powered on to obtain a total required power; and determining whether the total required power exceeds a preset second threshold power threshold, if yes, powering off a powered device that is currently powered on according to priorities corresponding to port numbers of all the powered devices that are currently powered on until the total required power is less than the second power threshold; if not, determining whether to power on the target powered device according to a preset first power threshold, wherein the second power threshold is greater than the first power threshold.

7 Claims, 1 Drawing Sheet

--- obtaining information about the connection of a target powered device, calculating a sum of actual power of all powered devices that are currently powered on to obtain a total required power — 101 determining whether the total required power exceeds a preset second power threshold, if yes, cutting off a powered device that is currently powered on according to priorities corresponding to port numbers of all the powered devices that are currently powered on until the total required power is less than the second power threshold; if not, determining whether to power on the target powered device according to a preset first power threshold, wherein the second power threshold is greater than the first power threshold — 102

(56) References Cited

U.S. PATENT DOCUMENTS

| | | | |
|---|---|---|---|
| 2008/0114998 A1 | 5/2008 | Ferentz et al. | |
| 2010/0030392 A1* | 2/2010 | Ferentz | H04L 12/10 700/295 |
| 2017/0068307 A1* | 3/2017 | Vavilala | G06F 1/3296 |

FOREIGN PATENT DOCUMENTS

| | | |
|---|---|---|
| CN | 102025509 | 4/2011 |
| CN | 103166765 | 6/2013 |
| CN | 103200015 | 7/2013 |
| CN | 103543765 | 1/2014 |
| CN | 103944739 | 7/2014 |
| WO | WO 2015/196677 | 12/2015 |

OTHER PUBLICATIONS

International Search Report and Written Opinion issued in Corresponding International Patent Application No. PCT/CN2017/100340, dated Oct. 27, 2017.

Office Action issued in Corresponding Chinese Application No. 201611006525.1, dated Mar. 16, 2020 (English Translation Provided).

Second Office Action issued in Corresponding Chinese Application No. 201611006525.1, dated Nov. 13, 2020 (English Translation provided).

Xu, Xiaotao. Power over Ethernet. Communication power supply technology and applications. pp. 275 & 277 (English translation provided).

* cited by examiner

POWER CONTROL METHOD, DEVICE AND ELECTRONIC EQUIPMENT IN ETHERNET POWER SUPPLY SYSTEM

CROSS-REFERENCE TO RELATED APPLICATIONS

The present application is a national phase under 35 U.S.C. § 371 of International Application No. PCT/CN2017/100340, filed Sep. 4, 2017, which claims priority to Chinese patent application No. 201611006525.1, filed with the China National Intellectual Property Administration on Nov. 16, 2016 entitled "POWER CONTROL METHOD, DEVICE AND ELECTRONIC EQUIPMENT IN ETHERNET POWER SUPPLY SYSTEM", each of which are incorporated herein by reference in their entirety.

TECHNICAL FIELD

The present application relates to power control technologies, and in particular, to a power control method, apparatus, and electronic device in a power over Ethernet system.

BACKGROUND

Power Over Ethernet (POE) refers to the technology to provide DC power supply to some IP-based terminal devices, such as IP phones, wireless LAN Access Point (AP), network cameras and the like while transmitting data signals to these terminal devices, without any changes to the existing Ethernet cabling infrastructure. With the power over Ethernet technology, the safety of power supply can be ensured while assuring the normal transmission of data signals, thus minimizing costs at the maximum extent.

In a power over Ethernet system, a Power Sourcing Equipment (PSE) and a Powered Device (PD) are included. The PSE is one end that provides power supply over a network cable and belongs to power providers, such as, a POE switch and a POE centralized power supply device. The PD is a powered device that accepts power supply from the PSE, that is, the other end that accepts power from the network cable, belonging to power accepters, such as IP phones, network security cameras, wireless access points, and many other Ethernet devices.

At present, the total output power of the power sourcing equipment supporting POE power supply is limited, and the powered devices that can be connected to the power over Ethernet system are also limited. When the total required power by the powered devices is less than the total output power, the power sourcing equipment can supply power for the respective powered devices normally, so that the connected powered devices can work normally. However, with the increase of the number of powered devices that are connected to the power over Ethernet system, if the total required power by the connected powered devices is greater than the total output power, the respective powered devices that are connected to the power over Ethernet system cannot work normally, thus causing the power over Ethernet system to be crashed, which reduces the reliability of the operation of the power over Ethernet system and affects user communication.

In order to improve the power control efficiency of the power over Ethernet system, in the prior art, the level of the powered device that is connected to the power over Ethernet system is obtained, the maximum power corresponding to the level is determined according to the obtained level, and the sum of the maximum power corresponding to each powered device is controlled to be not greater than the total output power. However, in this power control method, since each powered device does not always operate under the maximum power, the output power of the power sourcing equipment may be wasted, resulting in low power control efficiency and low output power utilization rate.

SUMMARY

In view of above, embodiments of the present application provide a power control method, apparatus, and electronic device applicable to a power over Ethernet system, which can improve power control efficiency of the power over Ethernet system, to solve the problem of low power control efficiency and low output power utilization rate due to the power control being performed according to the maximum power of the powered devices in the existing power over Ethernet system.

In a first aspect, an embodiment of the present application provides a power control method applicable to a power over Ethernet system, including:

determining whether there is a target powered device that needs to be connected to the power over Ethernet system;

when it is determined that there is a target powered device that needs to be connected to the power over Ethernet system, calculating a sum of actual power of all powered devices that are currently powered on to obtain a total required power;

determining whether the total required power exceeds a preset second power threshold, if yes, powering off a powered device that is currently powered on according to priorities corresponding to port numbers of all the powered devices that are currently powered on until the total required power is less than the second power threshold; if not, determining whether to power on the target powered device according to a preset first power threshold, wherein the second power threshold is greater than the first power threshold.

In combination with the first aspect, in a first implementation of the first aspect, determining whether to power on the target powered device according to the preset first power threshold includes:

determining whether the total required power exceeds the preset first power threshold in the power over Ethernet system, and if the total required power is less than or equal to the first power threshold, powering on the target powered device.

In combination with the first implementation of the first aspect, in a second implementation of the first aspect, the first power threshold is calculated using a following formula:

$$P_1 = P_2 - P_{imax}$$

in the formula,
$P_1$ is the first power threshold;
$P_2$ is the second power threshold;
$P_{imax}$ is a maximum power corresponding to a power level of the target powered device, obtaining the maximum power corresponding to the power level of the target powered device includes:

when it is determined that there is a target powered device connected to the power over Ethernet system, obtaining an identifier of the target powered device, and obtaining the power level of the target powered device according to a correspondence between identifiers of the powered devices and power levels;

querying a stored correspondence between power levels and maximum powers, to obtain the maximum power of the target powered device.

In combination of the first implementation of the first aspect, in a third implementation of the first aspect, the method further includes:

if the total required power is greater than the first power threshold, rejecting powering on the target powered device.

In combination with the first implementation of the first aspect, in a fourth implementation of the first aspect, the method further includes:

if the total required power is greater than the first power threshold, determining whether the priority corresponding to the port number of the target powered device is the lowest, if yes, rejecting powering on the target powered device, and if not, determining whether to power on the target powered device according to the priorities corresponding to the port numbers of the powered devices that are currently powered on and the first power threshold.

In combination with the fourth implementation of the first aspect, in a fifth implementation of the first aspect, determining whether to power on the target powered device according to the priorities corresponding to the port numbers of the powered devices that are currently powered on and the first power threshold includes:

selecting a powered device to be powered off from powered devices that are currently powered on and have priorities lower than the priority of the target powered device, and powering off the selected powered device to be powered off and powering on the target powered device when a sum of actual power of powered devices that are not selected and the maximum power of the target powered device is less than or equal to the first power threshold.

In a second aspect, an embodiment of the present application provides a power control apparatus applicable to a power over Ethernet system, including a power detection module and a power processing module.

The power detection module is configured for determining whether there is a target powered device that needs to be connected to the power over Ethernet system, when it is determined that there is a target powered device that needs to be connected to the power over Ethernet system, calculating a sum of actual power of all powered devices that are currently powered on to obtain a total required power.

The power processing module is configured for determining whether the total required power exceeds a preset second power threshold, if yes, powering off a powered device that is currently powered on according to priorities corresponding to port numbers of all the powered devices that are currently powered on until the total required power is less than the second power threshold; if not, determining whether to power on the target powered device according to a preset first power threshold, wherein the second power threshold is greater than the first power threshold.

In combination with the second aspect, in a first implementation of the second aspect, the power processing module includes a first determination unit, a cut-off processing unit and a second determination unit.

The first determination unit is configured for determining whether the total required power exceeds the preset second power threshold, if yes, notifying the cut-off processing unit; and if not, notifying the second determination unit.

The cut-off processing unit is configured for powering off a powered device that is currently powered on according to priorities corresponding to port numbers of all the powered devices that are currently powered on until the total required power is less than the second power threshold.

The second determination unit is configured for determining whether to power on the target powered device according to the preset first power threshold, wherein the second power threshold is greater than the first power threshold.

The second determination unit includes a first power threshold determination sub-unit and a second power sub-unit.

The first power threshold determination sub-unit is configured for determining whether the total required power exceeds the preset first power threshold in the power over Ethernet system, and if the total required power is less than or equal to the preset first power threshold, notifying the second power sub-unit.

The second power sub-unit is configured for receiving a notification and powering on the target powered device.

In combination with the first implementation of the second aspect, in a second implementation of the second aspect, the first power threshold is calculated using a following formula:

$$P_1 = P_2 - P_{imax}$$

in the formula, $P_1$ is the first power threshold;

$P_2$ is the second power threshold;

$P_{imax}$ is a maximum power corresponding to a power level of the target powered device, obtaining the maximum power corresponding to the power level of the target powered device includes:

when it is determined that there is a target powered device connected to the power over Ethernet system, obtaining an identifier of the target powered device, and obtaining the power level of the target powered device according to a correspondence between identifiers of the powered devices and power levels;

querying a stored correspondence between power levels and maximum powers, to obtain the maximum power of the target powered device.

In combination of the first implementation of the second aspect, in a third implementation of the second aspect, the first power threshold determination sub-unit is further configured for notifying a rejecting sub-unit if the total required power is greater than the first power threshold, the rejecting sub-unit is configured for rejecting powering on the target powered device.

In combination with the first implementation of the second aspect, in a fourth implementation of the second aspect, the second determination unit further includes:

a second priority processing sub-unit, configured for receiving a notification output by the first power threshold determination sub-unit when the total required power is greater than the first power threshold, determining whether the priority corresponding to the port number of the target powered device is the lowest, if yes, rejecting powering on the target powered device, and if not, determining whether to power on the target powered device according to the priorities corresponding to the port numbers of the powered devices that are currently powered on and the first power threshold.

In combination with the fourth implementation of the second aspect, in a fifth implementation of the second aspect, determining whether to power on the target powered device according to the priorities corresponding to the port numbers of the powered devices that are currently powered on and the first power threshold includes:

selecting a powered device to be powered off from powered devices that are currently powered on and have priorities lower than the priority of the target powered device, and powering off the selected powered device to be powered off and powering on the target powered device when a sum of actual power of powered devices that are not selected and the maximum power of the target powered device is less than or equal to the first power threshold.

In a third aspect, an embodiment of the present application provides an electronic device, including: a housing, a processor, a memory, a circuit board, and a power supply circuit, wherein the circuit board is disposed within a space enclosed by the housing, the processor and the memory are disposed on the circuit board; the power supply circuit is used for powering each circuit or component of the electronic device; the memory is used for storing executable program code; the processor is used for executing a program corresponding to the executable program code by reading executable program code stored in the memory, so as to implement any one of the power control methods applicable to a power over Ethernet system described above.

In a fourth aspect, an embodiment of the present application further provides an application program, wherein the application program is used to implement the power control method applicable to a power over Ethernet system provided by the present application when executed, the power control method including:

determining whether there is a target powered device that needs to be connected to the power over Ethernet system;

when it is determined that there is a target powered device that needs to be connected to the power over Ethernet system, calculating a sum of actual power of all powered devices that are currently powered on to obtain a total required power;

determining whether the total required power exceeds a preset second power threshold, if yes, powering off a powered device that is currently powered on according to priorities corresponding to port numbers of all the powered devices that are currently powered on until the total required power is less than the second power threshold; if not, determining whether to power on the target powered device according to a preset first power threshold, wherein the second power threshold is greater than the first power threshold.

In a fifth aspect, an embodiment of the present application further provides a storage medium for storing executable code, wherein the executable code is used to implement the power control method applicable to a power over Ethernet system provided by the present application when executed, the power control method including:

determining whether there is a target powered device that needs to be connected to the power over Ethernet system;

when it is determined that there is a target powered device that needs to be connected to the power over Ethernet system, calculating a sum of actual power of all powered devices that are currently powered on to obtain a total required power;

determining whether the total required power exceeds a preset second power threshold, if yes, powering off a powered device that is currently powered on according to priorities corresponding to port numbers of all the powered devices that are currently powered on until the total required power is less than the second power threshold; if not, determining whether to power on the target powered device according to a preset first power threshold, wherein the second power threshold is greater than the first power threshold.

In the power control method, apparatus, and electronic device applicable to a power over Ethernet system provided by the embodiments of the present application, whether there is a target powered device that needs to be connected to the power over Ethernet system is determined; when it is determined that there is a target powered device that needs to be connected to the power over Ethernet system, a sum of actual power of all powered devices that are currently powered on is calculated to obtain a total required power; whether the total required power exceeds a preset second power threshold is determined, if yes, a powered device that is currently powered on is cut off according to priorities corresponding to port numbers of all the powered devices that are currently powered on until the total required power is less than the second power threshold; if not, whether to power on the target powered device is determined according to a preset first power threshold, wherein the second power threshold is greater than the first power threshold. In this way, the power control efficiency of the power over Ethernet system is improved to solve the problem of low power control efficiency and low output power utilization rate due to power control being performed according to the maximum power of the powered devices in the existing power over Ethernet system.

BRIEF DESCRIPTION OF THE DRAWINGS

In order to illustrate the embodiments of the present application and the technical solutions of the prior art more clearly, drawings used in the embodiments and in the prior art will be briefly introduced below. Obviously, the drawings described below are only some embodiments of the application, other drawings may also be obtained by those of ordinary skill in the art without any creative efforts.

DETAILED DESCRIPTION OF THE INVENTION

The embodiments of the present application will be described below in combination with the accompanying drawings.

It should be noted that the described embodiments are only a part of the embodiments of the present application, not all of them. All other embodiments obtained by a person of ordinary skill in the art based on the embodiments of the present application without any creative efforts fall within the protection scope of the present application.

Figure 1:
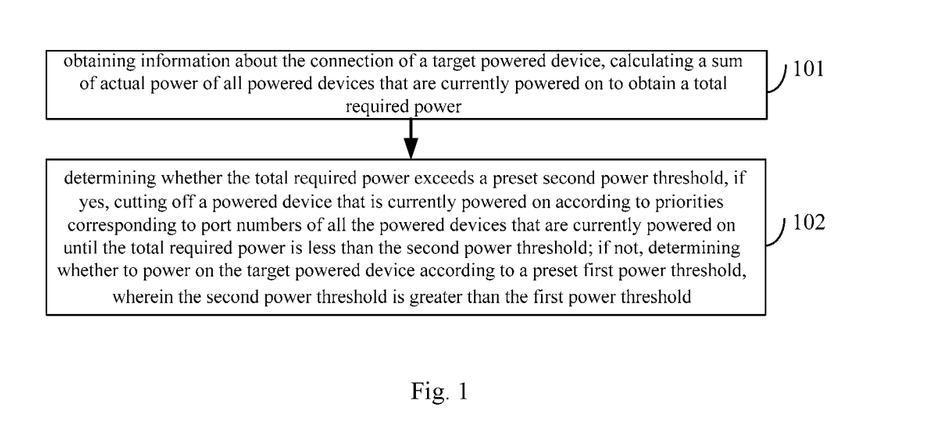
FIG. 1 is a schematic flowchart of a power control method applicable to a power over Ethernet system according to Embodiment 1 of the present application.

FIG. 1 is a schematic flowchart of a power control method used in a power over Ethernet system according to Embodiment 1 of the present application. As shown in FIG. 1, the method of this embodiment may include:

Step 101: obtaining information indicating that a target powered device is connected, calculating a sum of actual power of all powered devices that are currently powered on to obtain a total required power.

In this embodiment, whether there is a target powered device that needs to be connected to the power over Ethernet system is determined. When it is determined that there is a target powered device that needs to be connected to the power over Ethernet system, the sum of the actual power of all the powered devices that are currently powered on is calculated to obtain the total required power. When the information indicating that the target powered device is connected is obtained, the target powered device is not powered (powered on) temporarily.

In this embodiment, the sum of the actual power of all the powered devices that are currently powered on is the sum of the dynamic power of respective powered devices, that is, the actual output power of the current power sourcing equipment, which can prevent power waste and improve the power utilization rate.

Step 102: determining whether the total required power exceeds a preset second power threshold, if yes, powering off a powered device that is currently powered on according to priorities corresponding to port numbers of all the powered devices that are currently powered on until the total required power is less than the second power threshold; if not, determining whether to power on the target powered device according to a preset first power threshold, wherein the second power threshold is greater than the first power threshold.

In this embodiment, optionally, the second power threshold may be set to be the nominal output power of the power over Ethernet system or the maximum output power of the power over Ethernet system.

In this embodiment, a total required power is calculated, and then whether the total required power exceeds a preset second power threshold in the power over Ethernet system is determined. If the total required power exceeds the second power threshold, further processing needs to be performed according to a strategy. If the total required power does not exceed the second power threshold, it is also necessary to determine whether to power on the target powered device according to actual situations.

In this embodiment, the power over Ethernet system sets different power levels for the powered devices, so as to provide corresponding power according to the power level of the powered device, wherein the power level can be acquired from the obtained information about the connection of the target powered device. For example, an identifier of the target powered device is obtained, and a correspondence between the identifiers of the powered devices and the power levels is queried according to the identifier of the target powered device, and the power level of the target powered device can be obtained. After the power level of the target powered device is obtained, a stored correspondence between the power levels and maximum powers is queried to obtain the maximum power of the target powered device, so that the power of the target powered device is controlled under the maximum power. The power over Ethernet sets corresponding port numbers for different powered devices, and the port number has a corresponding priority, so as to indicate the importance of the powered device when it needs to be powered on. For example, the smaller the port number, the higher the priority.

Table 1 is a table schematically showing the correspondence between the power levels and the maximum powers in this embodiment.

TABLE 1

| power level | maximum power obtainable by the powered device |
|---|---|
| Class 0 | 13.0 W |
| Class 1 | 3.84 W |
| Class 2 | 6.49 W |
| Class 3 | 13.0 W |
| Class 4 | 25.5 W |

In actual applications, an obtainable power range corresponding to each power level can also be set in the correspondence. For example, for power level 0, the power range that the powered device can obtain is 0.44 to 13 w. For power level 1, the power range that the powered device can obtain is 0.44 to 3.84 w. For power level 2, the power range that the powered device can obtain is 3.84 to 6.49 w.

In this embodiment, when the total required power to be supplied by the power over Ethernet system is greater than the second power threshold, the powered device with a lower priority is cut off to ensure to continue supplying power for the powered device with higher priority.

In this embodiment, one or more control chips may be disposed in the power resourcing equipment, and each control chip supplies power for one or more powered devices of a same power level, and provides an access interface for the central processing unit (CPU) that calculates the total required power. The CPU can calculate the total required power by accessing the interface. In actual applications, the CPU may issue an instruction, and each control chip under its control reports the related information to the CPU when detecting that a powered device is connected, such as the power information of the connected powered device, and thus the CPU obtains the information about the connection of the powered device. Alternatively, the CPU directly monitors whether a powered device is connected, thereby obtaining the information about the connection of the powered device.

In this embodiment, by powering off the port of the powered device with a low priority, the device with a port of high priority can be ensured to work normally.

In this embodiment, optionally, the step of determining whether to power on the target powered device according to the preset first power threshold includes:

determining whether the total required power exceeds the preset first power threshold in the power over Ethernet system, and if the total required power is less than or equal to the first power threshold, powering on the target powered device.

In this embodiment, optionally, the first power threshold is calculated using a following formula:

$$P_1 = P_2 - P_{imax}$$

in the formula, $P_1$ is the first power threshold;

$P_2$ is the second power threshold;

$P_{imax}$ is the maximum power corresponding to the power level of the target powered device. The step of obtaining the maximum power corresponding to the power level of the target powered device includes:

when it is determined that there is a target powered device connected to the power over Ethernet system, obtaining an identifier of the target powered device, and obtaining the power level of the target powered device according to a correspondence between identifiers of the powered devices and power levels;

querying a stored correspondence between power levels and maximum powers, to obtain the maximum power of the target powered device.

In this embodiment, it is further determined whether the calculated total required power exceeds the first power threshold. If the total required power is less than or equal to the first power threshold, the target powered device is powered (powered on), otherwise further processing would be performed.

In this embodiment, optionally, the method further includes:

if the total required power is greater than the first power threshold, rejecting powering on the target powered device.

In this embodiment, by controlling the powering of the target powered device, the following purpose is achieved: when the total output power (the total required power) of the power over Ethernet system reaches the first power threshold, if there is a powered device to be connected, this powered device to be connected is not powered on. In other words, the priority of this target powered device is ignored, and the powering request is rejected, which can effectively avoid a situation in which the powered device is powered on and off repeatedly due to the fact that the total output power is around the second power threshold.

It can be understood that when the total required power is greater than the first power threshold, if the target powered device is connected, the total required power will increase, and the value of the total power may reach the second power threshold. In this case, some powered devices that are currently powered on need to be powered off, which will cause the powered devices to be powered on and off frequently. Therefore, in this embodiment, when the total required power is greater than the first power threshold, the target powered device to be connected is not powered on, so as to avoid the powered devices to be powered on and off frequently, thus ensuring the powering stability of the powered devices that are in the powered state.

In this embodiment, optionally, the method further includes:

if the total required power is greater than the first power threshold, determining whether the priority corresponding to the port number of the target powered device is the lowest, if yes, rejecting powering on the target powered device, and if not, determining whether to power on the target powered device according to the priorities corresponding to the port numbers of the powered devices that are currently powered on and the first power threshold.

In this embodiment, optionally, the step of determining whether the priority corresponding to the port number of the target powered device is the lowest may include determining whether the priority corresponding to the port number of the target powered device is the lowest among the priorities of all the powered devices that are currently powered on. More specifically, the step of determining whether the priority corresponding to the port number of the target powered device is the lowest among the priorities of all the powered devices that are currently powered on may include sorting the priority of the target powered device and the priorities of all the powered devices that are currently powered on in an order from low to high or high to low, and determining whether the priority of the target powered device is the lowest according to the sorting result.

In this embodiment, optionally, the step of determining whether to power on the target powered device according to the priorities corresponding to the port numbers of the powered devices that are currently powered on and the first power threshold includes:

selecting a powered device to be powered off from powered devices that are currently powered on and have priorities lower than the priority of the target powered device, and powering off the selected powered device to be powered off and powering on the target powered device when a sum of actual power of powered devices that are not selected and the maximum power of the target powered device is less than or equal to the first power threshold.

The action of cutting off the selected powered device to be powered off can be understood as powering off the selected powered device to be powered off.

In this embodiment, optionally, if there are multiple target powered devices, then they are powered on according to a descending order of their priorities. If there are multiple target powered devices and they have the same priority, a target powered device may be selected arbitrarily from the multiple target powered devices. Alternatively, a target powered device may be selected according to a preset selection strategy, and a powered device to be powered off is selected from powered devices that are currently powered on and have priorities lower than the priority of the target powered device. The selected powered device to be powered off is powered off and the targeted powered device is powered on when the sum of the actual power of the unselected powered devices and the maximum power of the target powered device is less than or equal to the first threshold power threshold.

In the power control method applicable to the power over Ethernet system provided by this embodiment, information about the connection of a target powered device is obtained, the sum of actual power of all powered devices that are currently powered on is calculated to obtain a total required power; whether the total required power exceeds a preset second power threshold is determined, if yes, powering off the powered devices that are currently powered on according to priorities corresponding to port numbers of all the powered devices that are currently powered on until the total required power is less than the second power threshold; if not, whether to power on the target powered device is determined according to a preset first power threshold, wherein the second power threshold is greater than the first power threshold. In this way, the power consumption of each powered device is calculated dynamically in real time, instead of using the maximum power of each level in the 802.3at/af protocol, which ensures the power utilization rate in the power over Ethernet system and effectively improves the power control efficiency of the power over Ethernet system. Moreover, priorities corresponding to the port numbers of the powered devices are used, when the total output power (the power consumed by all powered devices) reaches the second power threshold, the powered device with low priority is cut off to ensure that the powered device with high priority can work normally. When the total output power reaches the first power threshold, the powered device newly connected is no longer powered on, which can effectively avoid the situation in which the powered device is powered on and off repeatedly due to the fact that the total output power is around the second power threshold. Further, the second power threshold is the maximum output power of the power over Ethernet system, and the first power threshold is calculated according to the difference between the maximum power corresponding to the power level of the powered device that requires to be powered on and the second power threshold, which is a dynamic value.

Figure 2:
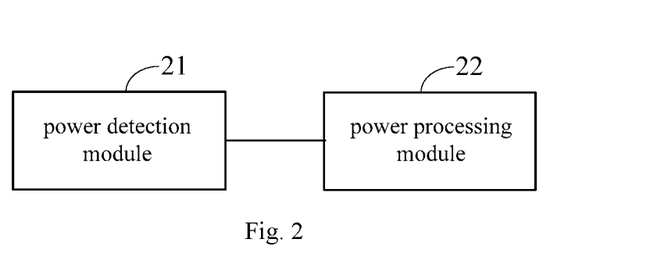
FIG. 2 is a schematic structural diagram of a power control apparatus applicable to a power over Ethernet system according to Embodiment 2 of the present application.

FIG. 2 is a schematic structural diagram of a power control apparatus applicable to a power over Ethernet system according to Embodiment 2 of the present application. As shown in FIG. 2, the apparatus in this embodiment may include a power detection module 21 and a power processing module 22.

The power detection module 21 is configured for determining whether there is a target powered device that needs to be connected to the power over Ethernet system, when it is determined that there is a target powered device that needs to be connected to the power over Ethernet system, calculate a sum of actual power of all powered devices that are currently powered on to obtain a total required power.

In this embodiment, the sum of the actual power of all the powered devices that are currently powered on is the sum of the dynamic power of respective powered devices that are powered on, that is, the actual output power of the current power sourcing equipment, which can prevent power waste and increase power utilization rate.

The power processing module 22 is configured for determining whether the total required power exceeds a preset second power threshold, if yes, powering off a powered device that is currently powered on according to priorities corresponding to port numbers of all the powered devices that are currently powered on until the total required power is less than the second power threshold; if not, determining whether to power on the target powered device according to a preset first power threshold, wherein the second power threshold is greater than the first power threshold.

In this embodiment, optionally, the second power threshold may be set to be the nominal output power of the power over Ethernet system or the maximum output power of the power over Ethernet system.

In this embodiment, optionally, the power processing module 22 includes a first determination unit, a cut-off processing unit and a second determination unit (not shown in drawings).

The first determination unit is configured for determining whether the total required power exceeds the preset second power threshold, if yes, notifying the cut-off processing unit; and if not, notifying the second determination unit.

The cut-off processing unit is configured for powering off a powered device that is currently powered on according to priorities corresponding to port numbers of all the powered devices that are currently powered on until the total required power is less than the second power threshold.

In this embodiment, the power over Ethernet system sets different power levels for the powered devices, so as to supply corresponding power according to the power level of a powered device, and set priorities corresponding to port numbers of different powered devices, so as to indicate the importance of the powered device when it needs to be powered on.

The second determination unit is configured for determining whether to power on the target powered device according to the preset first power threshold, wherein the second power threshold is greater than the first power threshold.

In this embodiment, optionally, the second determination unit includes a first power threshold determination sub-unit and a second power sub-unit.

The first power threshold determination sub-unit is configured for determining whether the total required power exceeds the preset first power threshold in the power over Ethernet system, and if the total required power is less than or equal to the first power threshold, notifying the second power sub-unit.

In this embodiment, optionally, the first power threshold is calculated using a following formula:

$P_1 = P_2 - P_{imax}$ in the formula, $P_1$ is the first power threshold;

$P_2$ is the second power threshold;

$P_{imax}$ is the maximum power corresponding to the power level of the target powered device. The step of obtaining the maximum power corresponding to the power level of the target powered device includes:

when it is determined that there is a target powered device connected to the power over Ethernet system, obtaining an identifier of the target powered device, and obtaining the power level of the target powered device according to a correspondence between identifiers of the powered devices and power levels;

querying a stored correspondence between power levels and maximum powers, to obtain the maximum power of the target powered device.

The second power sub-unit is configured for receiving a notification and powering on the target powered device.

In this embodiment, optionally, the first power threshold determination sub-unit is further configured for notifying a rejecting sub-unit if the total required power is greater than the first power threshold.

The rejecting sub-unit is configured for rejecting powering on the target powered device.

In this embodiment, optionally, the second determination unit further includes:

a second priority processing sub-unit, configured for receiving a notification output by the first power threshold determination sub-unit when the total required power is greater than the first power threshold, determining whether the priority corresponding to the port number of the target powered device is the lowest, if yes, rejecting powering on the target powered device, and if not, determining whether to power on the target powered device according to the priorities corresponding to the port numbers of the powered devices that are currently powered on and the first power threshold.

In this embodiment, optionally, determining whether to power on the target powered device according to the priorities corresponding to the port numbers of the powered devices that are currently powered on and the first power threshold includes:

selecting a powered device to be powered off from powered devices that are currently powered on and have priorities lower than the priority of the target powered device, and powering off the selected powered device to be powered off and powering on the target powered device when a sum of actual power of powered devices that are not selected and the maximum power of the target powered device is less than or equal to the first power threshold.

The apparatus of this embodiment may be used to implement the technical solution of the method embodiment shown in FIG. 1, and the implementation principle and technical effects are similar, and thus details are not described herein again.

It should be noted that the correspondence terms herein such as "first", "second", and the like are only used for distinguishing one entity or operation from another entity or operation, but do not necessarily require or imply that there is any actual correspondence or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements The various embodiments in the present specification are described in a related manner, and the same or similar parts among the various embodiments may be referred to each other, and each embodiment focuses on the differences from the other embodiments.

In particular, for the apparatus embodiment, since it is basically similar to the method embodiment, the description is relatively simple, and the relevant parts can be referred to the description of the method embodiment.

The logic and/or steps represented in the flowchart or otherwise described herein, for example, may be considered as an ordered list of executable instructions for implementing logical functions, and may be embodied in any computer readable medium for use by an instruction execution system, apparatus, or device, or use in conjunction with them (e.g. a computer-based system, a system including a processor, or other system that can read and execute instructions from an instruction execution system, apparatus, or device). For this specification, a "computer readable medium" can be any apparatus that can contain, store, communicate, propagate, or transmit a program for use by an instruction execution system, apparatus, or device, or in conjunction with them. More specific examples (non-exhaustive) of the computer readable medium include: electrical connections (electronic devices) having one or more wires, portable computer disk cartridges (magnetic devices), random access memory (RAM), read only memory (ROM), erasable programmable read only memory (EPROM or flash memory), fiber optic devices, and portable compact disk read only memory (CDROM). In addition, the computer readable medium may even be a paper or other suitable medium on which the program can be printed, as the paper or other medium may be for example optically scanned, and then edited, interpreted or, if appropriate, processed by other suitable method to obtain the program electronically and then stored the program in a computer memory.

It should be understood that parts of the apparatus of the present application can be implemented in hardware, software, firmware, or a combination thereof.

In the above-described embodiments, multiple steps or methods may be implemented by a software or firmware that is stored in a memory and executed by a suitable instruction execution system. For example, if implemented by a hardware, as in another embodiment, it can be implemented by any one or combination of the following techniques well known in the art: discrete logic circuits having logic gates for implementing logic functions on data signals, dedicated integrated circuits with suitable combinational logic gates, programmable gate arrays (PGAs), field programmable gate arrays (FPGAs), etc.

An embodiment of the present application further provides an electronic device, where the electronic device includes the apparatus described in any of the foregoing embodiments.

Figure 3:
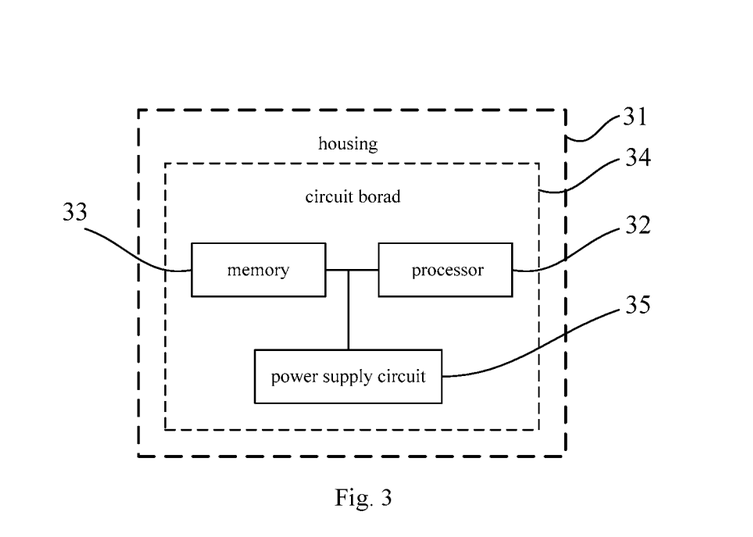
FIG. 3 is a schematic structural diagram of an embodiment of an electronic device according to the present application.

FIG. 3 is a schematic structural diagram of an embodiment of the electronic device according to the present application, which can implement the process of the embodiment shown in FIG. 1. As shown in FIG. 3, the electronic device may include a housing 31, a processor 32, a memory 33, a circuit board 34 and a power supply circuit 35, wherein the circuit board 34 is disposed within a space enclosed by the housing 31, the processor 32 and the memory 33 are disposed on the circuit board 34; the power supply circuit 35 is used for powering each circuit or component of the electronic device; the memory 33 is used for storing executable program code; the processor 32 is used for executing a program corresponding to the executable program code by reading executable program code stored in the memory 33, so as to implement the power control method applicable to the power over Ethernet system described in any one of the above embodiments.

Specifically, the processor 32 executes a program corresponding to the executable program code by reading the executable program code stored in the memory 33 for performing the following steps:

determining whether there is a target powered device that needs to be connected to the power over Ethernet system;

when it is determined that there is a target powered device that needs to be connected to the power over Ethernet system, calculating a sum of actual power of all powered devices that are currently powered on, to obtain a total required power;

determining whether the total required power exceeds a preset second power threshold, if yes, powering off a powered device that is currently powered on according to priorities corresponding to port numbers of all the powered devices that are currently powered on until the total required power is less than the second power threshold; if not, determining whether to power on the target powered device according to a preset first power threshold, wherein the second power threshold is greater than the first power threshold.

The specific execution by the processor 32 for the above steps and the further execution by the processor 32 executing the executable program code can be referred to the description of the embodiment shown in FIG. 1 of the present application, which will be omitted herein.

The electronic device exists in a variety of forms including, but not limited to:

(1) mobile communication devices: these devices are characterized by mobile communication functions and are mainly aimed at providing voice and data communication. Such terminals include smart phones (such as iPhone), multimedia phones, functional phones, and other phones.

(2) ultra-mobile personal computer devices: these devices belong to the category of personal computers, have computing and processing functions, and generally have mobile Internet features. Such terminals include PDAs, MIDs, and UMPC devices, such as an iPad.

(3) portable entertainment devices: these devices can display and play multimedia content. Such devices include audio, video players (such as an iPod), handheld game consoles, e-books, and smart toys and portable vehicle navigation devices.

(4) server: a device that provides computing services. The server consists of a processor, a hard disk, a memory, a system bus, etc. The server is similar to a general-purpose computer, but due to the need to provide highly reliable services, the server has higher requirements in terms of processing ability, stability, reliability, security, scalability, and manageability.

(5) other electronic devices with data interaction functions.

One of ordinary skill in the art can understand that all or part of the steps of the method for implementing the above embodiments can be performed by a program to instruct related hardware, and the program can be stored in a computer readable storage medium. When the program is executed, one or a combination of the steps of the method embodiments can be performed.

It can be seen that, in this embodiment, the power control efficiency of the power over Ethernet system can be improved to solve the problem of low power control efficiency and low output power utilization rate due to the power control being performed according to the maximum power of the powered devices in the existing power over Ethernet system.

For the convenience, the above apparatus are described as being divided into various units/modules by function. Of course, the function of each unit/module may be implemented in a same or multiple software and/or hardware when implementing the present application.

The present application further provides an application program for implementing the power control method applicable to a power over Ethernet system described in the foregoing embodiments when executed, the power control method includes:

determining whether there is a target powered device that needs to be connected to the power over Ethernet system;

when it is determined that there is a target powered device that needs to be connected to the power over Ethernet system, calculating a sum of actual power of all powered devices that are currently powered on to obtain a total required power;

determining whether the total required power exceeds a preset second power threshold, if yes, powering off a powered device that is currently powered on according to priorities corresponding to port numbers of all the powered devices that are currently powered on until the total required power is less than the second power threshold; if not, determining whether to power on the target powered device according to a preset first power threshold, wherein the second power threshold is greater than the first power threshold.

It can be seen that, in this embodiment, the power control efficiency of the power over Ethernet system can be improved to solve the problem of low power control efficiency and low output power utilization rate due to the power control being performed according to the maximum power of the powered devices in the existing power over Ethernet system.

The present application further provides a storage medium for storing executable code, where the executable code is used to execute the power control method applicable to a power over Ethernet system described in the foregoing embodiments when executed, the power control method including:

determining whether there is a target powered device that needs to be connected to the power over Ethernet system;

when it is determined that there is a target powered device that needs to be connected to the power over Ethernet system, calculating a sum of actual power of all powered devices that are currently powered on to obtain a total required power;

determining whether the total required power exceeds a preset second power threshold, if yes, powering off a powered device that is currently powered on according to priorities corresponding to port numbers of all the powered devices that are currently powered on until the total required power is less than the second power threshold; if not, determining whether to power on the target powered device according to a preset first power threshold, wherein the second power threshold is greater than the first power threshold.

It can be seen that, in this embodiment, the power control efficiency of the power over Ethernet system can be improved to solve the problem of low power control efficiency and low output power utilization rate due to the power control being performed according to the maximum power of the powered devices in the existing power over Ethernet system.

It will be apparent to those skilled in the art from the above description of the embodiments that the present application can be implemented by means of software plus a necessary general hardware platform. Based on such understanding, the technical solution of the present application may be embodied in the form of a software product in essence or the part of the present application, which contributes to the prior art, may be embodied in the form of a software product. The software product may be stored in a storage medium such as a ROM/RAM or a disk, an optical disk, etc., and includes instructions for causing a computer device (which may be a personal computer, server, or network device, etc.) to perform the methods described in various embodiments or in portions of the embodiments of the present application.

The foregoing are only specific embodiments of the present application, the protection scope of the present application is not limited thereto, and any change or replacement that can be easily conceived by those skilled in the art within the technical scope disclosed by the present application should be covered by the protection scope of this application. Therefore, the protection scope of this application should be determined by the claims.

The invention claimed is:

1. A power control method applicable to a power over Ethernet system, comprising: determining whether there is a target powered device that needs to be connected to the power over Ethernet system;

when it is determined that there is a target powered device that needs to be connected to the power over Ethernet system, calculating a sum of actual power of all powered devices that are currently powered on to obtain a total required power;

determining whether the total required power exceeds a preset second power threshold, when the total required power exceeds the preset second power threshold, powering off a powered device that is currently powered on according to priorities corresponding to port numbers of all the powered devices that are currently powered on until the total required power is less than the second power threshold;

when the total required power does not exceed the preset second power threshold, determining whether to power on the target powered device according to a preset first power threshold, wherein the second power threshold is greater than the first power threshold, determining whether to power on the target powered device according to the preset first power threshold comprises:

determining whether the total required power exceeds the preset first power threshold in the power over Ethernet system, when the total required power does not exceed the preset second power threshold and is greater than the first power threshold, determining whether a priority corresponding to a port number of the target powered device is the lowest;

when the priority of the target powered device is the lowest, rejecting powering on the target powered device; and when the priority of the target powered device is not the lowest, selecting a powered device to be powered off from powered devices that are currently powered on and have priorities lower than the priority of the target powered device, and powering off the selected powered device to be powered off and powering on the target powered device when a sum of actual power of powered devices that are not selected and the maximum power of the target powered device is less than or equal to the first power threshold.

2. The power control method applicable to a power over Ethernet system according to claim 1, wherein determining whether to power on the target powered device according to the preset first power threshold comprises: when the total required power is less than or equal to the first power threshold, powering on the target powered device.

3. The power control method applicable to a power over Ethernet system according to claim 2, wherein the first power threshold is calculated using a following formula:

$$P_1 = P_2 - P_{imax}$$

in the formula, $P_1$ is the first power threshold;

$P_2$ is the second power threshold;

$P_{imax}$ is a maximum power corresponding to a power level of the target powered device, obtaining the maximum power corresponding to the power level of the target powered device comprises:

when it is determined that there is a target powered device connected to the power over Ethernet system, obtaining an identifier of the target powered device, and obtaining the power level of the target powered device according to a correspondence between identifiers of the powered devices and power levels;

querying a stored correspondence between power levels and maximum powers to obtain the maximum power of the target powered device.

4. A non-transitory storage medium for storing executable code, wherein the executable code is used to implement the power control method applicable to a power over Ethernet system according to claim 1.

5. A power control apparatus applicable to a power over Ethernet system, comprising a processor and a memory having computer program stored thereon which, when being executed by the processor, causing the processor to perform operations of:

determining whether there is a target powered device that needs to he connected to the power over Ethernet system, when it is determined that there is a target powered device that needs to be connected to the power over Ethernet system, calculating a sum of actual power of all powered devices that are currently powered on to obtain a total required power;

determining whether the total required power exceeds a preset second power threshold, if when the total required power exceeds the preset second power threshold, powering off a powered device that is currently powered on according to priorities corresponding to port numbers of all the powered devices that are currently powered on until the total required power is less than the second power threshold;

when the total required power does not exceed the preset second power threshold, determining whether to power on the target powered device according to a preset first power threshold, wherein the second power threshold is greater than the first power threshold; determining whether to power on the target powered device according to the preset first power threshold. comprises:

determining whether the total required power exceeds the preset first power threshold in the power over Ethernet system, when the total required power does not exceed the preset second power threshold and is greater than the first power threshold, determining whether a priority corresponding to a port number of the target powered device is the lowest;

when the priority of the target powered device is the lowest, rejecting powering on the target powered device; and if when the priority of the target powered device is not the lowest, selecting a powered device to be powered off from powered devices that are currently powered on and have priorities lower than the priority of the target powered device and powering off the selected powered device to be powered off and powering on the target powered device when a sum of actual power of powered devices that are not selected and the maximum power of the target powered device is less than or equal to the first power threshold.

6. The power control apparatus applicable to a power over Ethernet system according to claim 5, wherein the operation of determining whether to power on the target powered device according to the preset first power threshold comprises: when the total required power is less than or equal to the first power threshold, powering on the target powered device.

7. The power control apparatus applicable to a power over Ethernet system according to claim 6, wherein the first power threshold is calculated using a following formula:

$$P_1 = P_2 - P_{imax}$$

in the formula, $P_1$ is the first power threshold;

$P_2$ is the second power threshold;

$P_{imax}$ is a maximum power corresponding to a power level of the target powered device, obtaining the maximum power corresponding to the power level of the target powered device comprises:

when it is determined that there is a target powered device connected to the power over Ethernet system, obtaining an identifier of the target powered device, and obtaining the power level of the target powered device according to a correspondence between identifiers of the powered devices and power levels;

querying a stored correspondence between power levels and maximum powers to obtain the maximum power of the target powered device.

* * * * *